United States Patent
Mizuno et al.

(10) Patent No.: US 6,196,638 B1
(45) Date of Patent: Mar. 6, 2001

(54) BICYCLE WHEEL

(75) Inventors: Toshio Mizuno, Osaka; Masanori Sugimoto, Sayama; Koji Shimizu, Izumi, all of (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/222,083

(22) Filed: Dec. 29, 1998

(51) Int. Cl.$^7$ ............... B60B 1/00; B60B 5/00; B60B 9/26

(52) U.S. Cl. ............... 301/104; 301/79; 301/95

(58) Field of Search ............... 301/64.7, 104, 301/66, 73, 79, 95, 96, 97, 98; 152/69, 75, 80, 86, 11, 12

(56) References Cited

U.S. PATENT DOCUMENTS

| | | |
|---|---|---|
| 452,649 | 5/1891 | Powell . |
| 1,071,314 * | 8/1913 | Hardin ............... 152/69 |
| 1,081,844 * | 12/1913 | Laurencich ............... 301/104 |
| 1,139,951 * | 5/1915 | Bridges ............... 152/86 |
| 1,167,757 * | 1/1916 | Hess ............... 152/11 |
| 1,289,517 * | 12/1918 | Musselman ............... 152/80 |
| 1,298,592 * | 3/1919 | Smith ............... 152/80 |
| 1,349,019 * | 8/1920 | Timberlake ............... 152/80 |
| 1,462,865 * | 7/1923 | Lieckfelt ............... 152/80 |
| 3,567,285 | 3/1971 | Faurot ............... 301/37 |
| 3,709,561 | 1/1973 | De Biasse et al. ............... 301/6 E |
| 4,153,267 * | 5/1979 | Hilber ............... 301/104 |
| 4,240,483 * | 12/1980 | Gregoric ............... 152/75 |
| 4,523,790 | 6/1985 | Mariani ............... 301/64 |
| 4,553,577 * | 11/1985 | Gregg ............... 152/80 |
| 4,573,745 | 3/1986 | Fujisaki et al. ............... 301/63 |
| 4,702,527 | 10/1987 | Kawano ............... 301/9 |
| 4,793,659 | 12/1988 | Oleff et al. ............... 301/63 |
| 4,919,490 | 4/1990 | Hopkins et al. ............... 301/63 |
| 4,995,675 | 2/1991 | Tsai ............... 301/63 |
| 5,104,199 | 4/1992 | Schlanger ............... 301/63 |
| 5,125,443 * | 6/1992 | Schwartzman ............... 301/104 |
| 5,232,270 * | 8/1993 | Helterbrand ............... 301/104 |
| 5,246,275 | 9/1993 | Arredondo, Jr. ............... 301/64.7 |
| 5,452,945 | 9/1995 | Schlanger ............... 301/58 |
| 5,540,485 | 7/1996 | Enders ............... 301/104 |

FOREIGN PATENT DOCUMENTS

| | | |
|---|---|---|
| 0648620 | 4/1995 | (EP) . |
| 0685384 | 12/1995 | (EP) . |
| 68419 * | 1/1914 | (GB) ............... 152/75 |
| 49-43868 | 4/1974 | (JP) . |
| 54-28218 | 3/1979 | (JP) . |
| 63-190150 | 8/1988 | (JP) . |
| 45102 | 1/1992 | (JP) . |
| 48602 | 1/1992 | (JP) . |
| 633178 | 2/1994 | (JP) . |
| 8132803 | 5/1996 | (JP) . |
| 9625296 | 8/1996 | (WO) . |

\* cited by examiner

Primary Examiner—S. Joseph Morano
Assistant Examiner—Jason R. Bellinger
(74) Attorney, Agent, or Firm—Shinjyu Global IP Counselors, LLP

(57) ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of openings for receiving the outer ends of the spokes therein. In the most preferred embodiment, the bicycle wheel is a one-piece, unitary wheel. Preferably, the one-piece, unitary bicycle wheel of the present invention is produced by die-casting. The preferred material for bicycle wheel of the present invention is magnesium (Mg). A centrally located rib portion is located between adjacent spoke portions and to reinforce the rim portion between spokes. Rib portions extend radially inwardly from the inner peripheral surface of rim portion. Preferably, the middle segment of each of the rib portions has a radial height that is approximately equal to the base rim height plus more than half of the base rim height. The shapes of spoke portions are designed to absorb the vibrations from the ground as it is being used in the bicycle. This shock absorbing function is enhanced by the use of magnesium for the wheel.

50 Claims, 6 Drawing Sheets

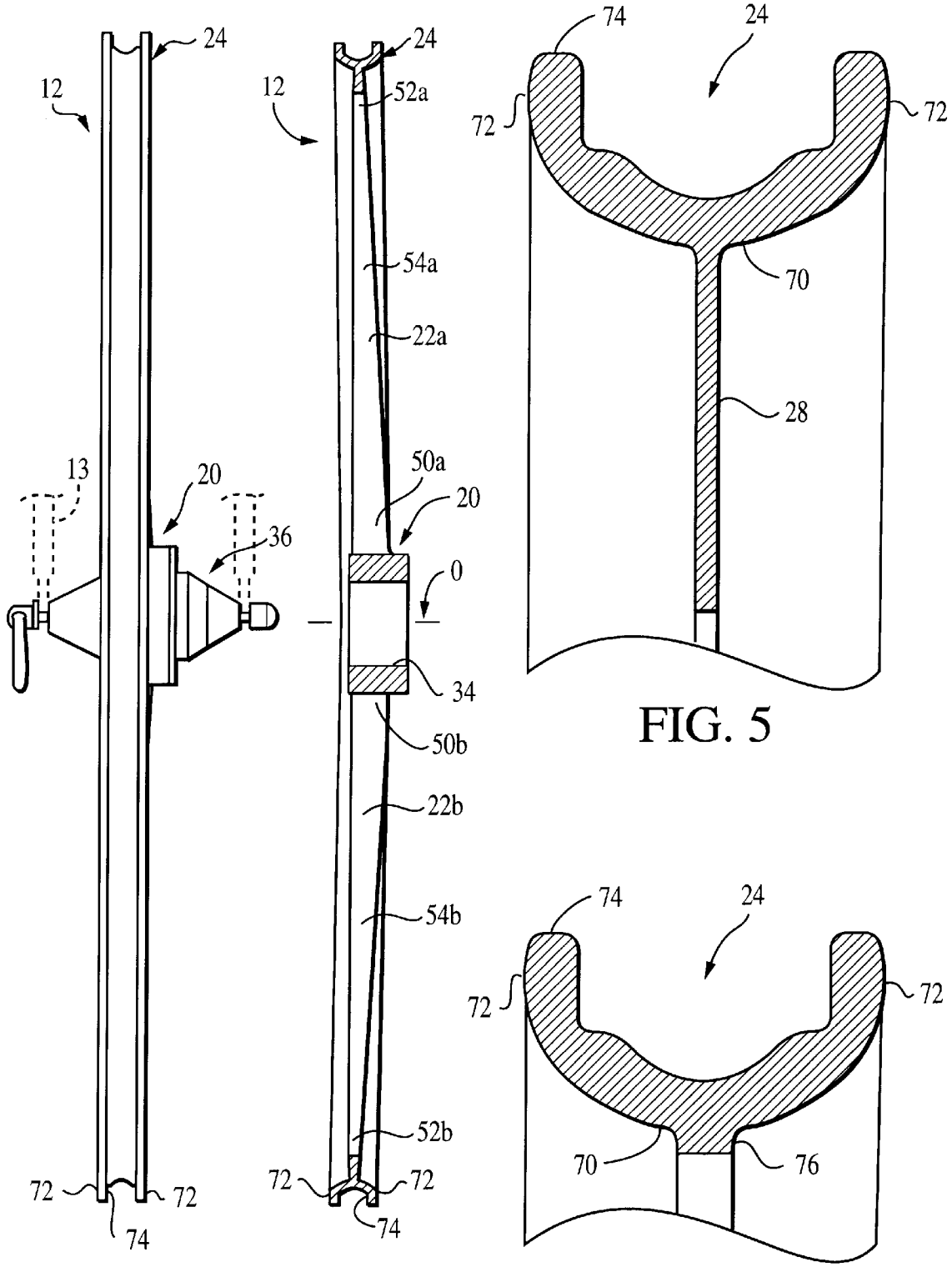

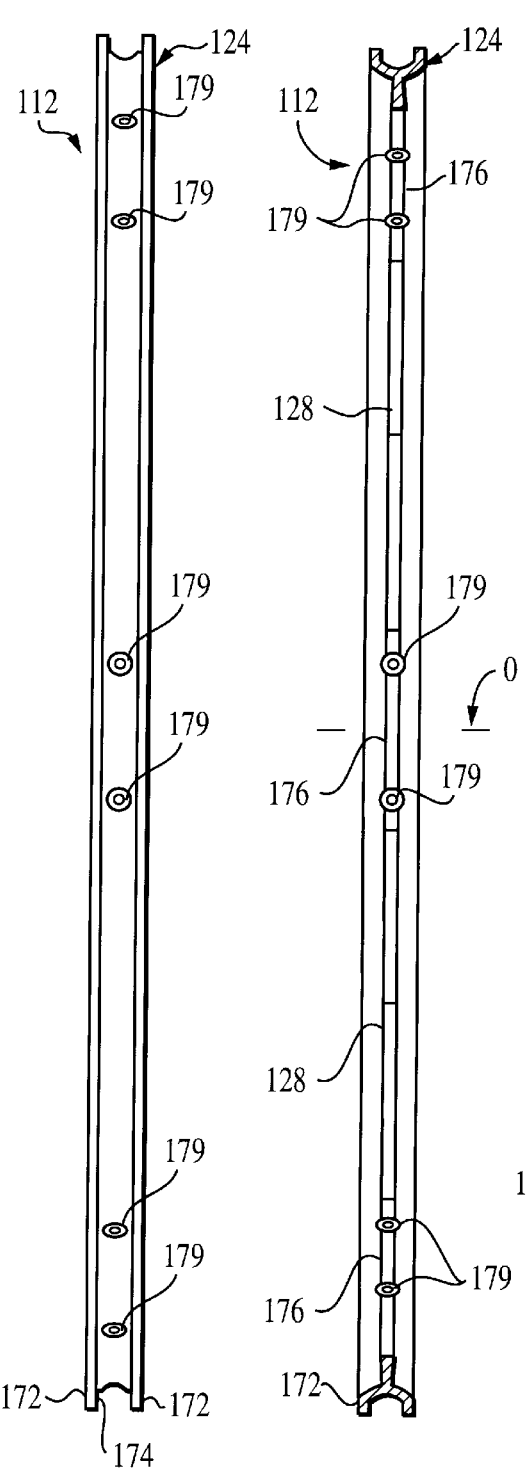
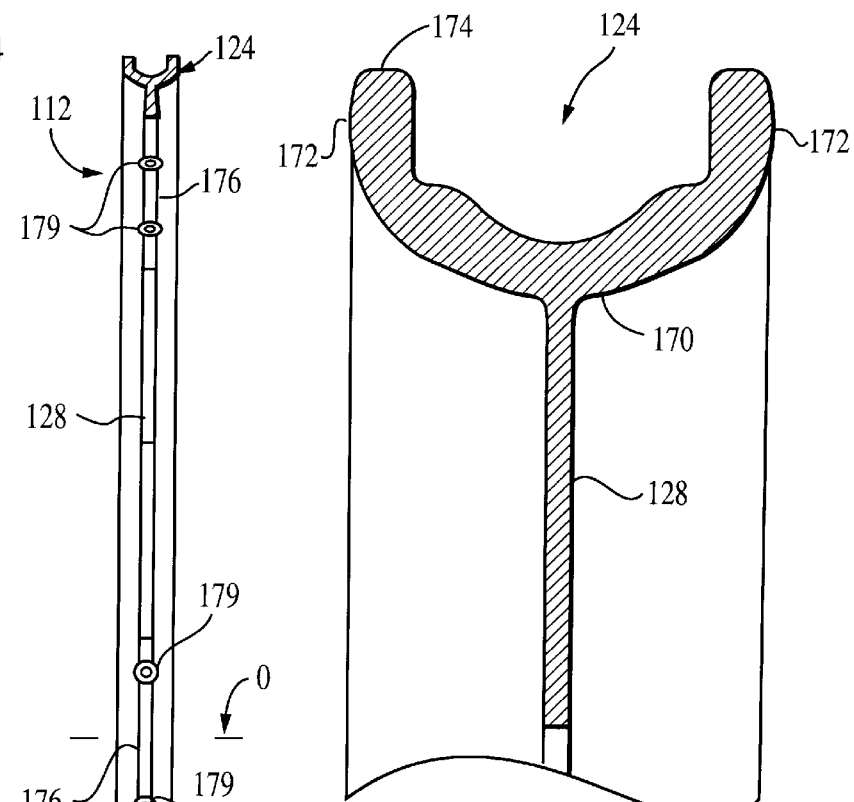
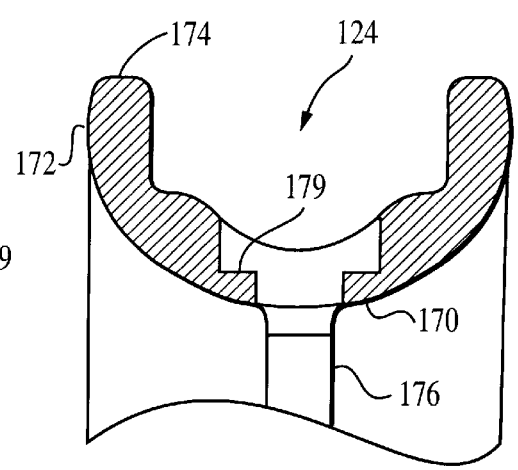
FIG. 11  FIG. 12  FIG. 13  FIG. 14

BICYCLE WHEEL

BACKGROUND OF THE INVENTION

1. Field of the Invention

This invention generally relates to bicycle wheels. More specifically, the present invention relates to unitary bicycle wheels that include a hub portion, a plurality of spoke portions and a rim portion.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles that has been extensively redesigned over the past years is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub, a plurality of spokes and an annular rim. The hub is attached to a part of the frame of the bicycle for relative rotation. The spokes extend outwardly from the hub to the annular rim. The annular rim has a recess for supporting a pneumatic tire thereon. Typically, the spokes of the bicycle wheel were thin metal wire spokes. The ends of the hub are provided with a flange that is used to couple the spoke portions thereto. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples that secure the outer ends of the wire spokes to the rim. In particular, the spoke nipples have flanges, which engage the interior surface of the rim.

With a spoke constructed in this manner, the nipple is installed in a nipple hole formed in the rim, the spoke is inserted through the hole of the hub flange with the flange of the inner end of the spoke engaging the hole of the hub flange. The male threads on the outer ends of the spokes are threaded into the female threads of the spoke nipples installed in the openings of the rim.

Recently, many new bicycle designs have been developed with increased strength, more aerodynamic designs or that are more lightweight. However, these prior art bicycle designs suffer many disadvantages. One major problem with these prior art designs is that most of these new designs are very expensive. Therefore, these expensive designs are limited to professional riders. Many of the newer bicycle wheels are unitary bicycle wheels. These unitary bicycle wheels have been designed to be are very durable. However, they can be very heavy. Moreover, many of these unitary designs are too rigid and do not provide a very comfortable ride. These unitary bicycle wheels are also typically very expensive. Accordingly, these prior art unitary bicycle wheels suffer from many disadvantages.

In view of the above, there exists a need for a bicycle wheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle wheel with a rim that has enhanced strength.

Another object of the present invention is to provide a bicycle wheel with spokes that provide a shock absorbing function.

Another object of the present invention is to provide a bicycle wheel with fewer spokes extending between the rim and the hub.

Another object of the present invention is to provide a bicycle wheel, which is lightweight in design.

The foregoing objects can further be attained by providing a bicycle wheel, comprising a hub portion, a plurality of first spoke portions, a plurality of second spoke portions, an annular rim portion and a plurality of rib portions. The hub portion has an axial bore that is adapted to receive a hub assembly therein. The first spoke portions extend outwardly from the hub portion. Each of the first spoke portions has a first inner end coupled to the hub portion and a first outer end. The second spoke portions extend outwardly from the hub portion between the first spoke portions. Each of the second spoke portions has a second inner end coupled to the hub portion and a second outer end. The annular rim portion has an outer peripheral surface forming a recess adapted to receive a tire thereon and an inner peripheral surface coupled to the first and second outer ends of the first and second spoke portions. The first outer ends of the first spoke portions are circumferentially spaced by a first distance from an adjacent one of the second spoke portions located on one side and circumferentially spaced by a second distance from another adjacent one of the second spoke portions on the other side. The second distance is smaller than the first distance. The rib portions extend from the inner peripheral surface of the annular rim portion between at least some of adjacent pairs of the first and second spoke portions that are separated by the first distance. Each of the rib portions has a circumferential dimension extending between its ends and a radial dimension. The radial dimension of each of the rib portions increases in length as each of the rib portions extends from the ends to a middle rib section.

Also the foregoing objects can further be attained by providing a bicycle wheel, comprising a hub portion, a plurality of first spoke portions, a plurality of second spoke portions, an annular rim portion and a plurality of rib portions. A hub portion having an axial bore that is adapted to receive a hub assembly therein. The first spoke portions extend outwardly from the hub portion with each of the first spoke portions having a first inner end coupled to the hub portion, a first outer end, and a first middle section located between the first inner and first outer ends. The first middle section is configured with a first bent segment to decrease radial stiffness of the wheel and to allow the first spoke portions to bend in a circumference direction. The annular rim portion has an inner peripheral surface coupled to the outer ends of the first spoke portions and an outer peripheral surface adapted to receive a tire thereon. Also the foregoing objects can further be attained by providing a bicycle wheel, comprising a hub portion, a plurality of first spoke portions, a plurality of second spoke portions, an annular rim portion and a plurality of rib portions. The hub portion has an axial bore that is adapted to receive a hub assembly therein. The spoke portions extend outwardly from the hub portion with each of the spoke portions having an inner end coupled to the hub portion and an outer end. The annular rim portion has an outer peripheral surface forming a recess adapted to receive a tire thereon, first and second annular side surfaces coupled to the outer annular surface and an inner peripheral surface coupled to the outer ends of the spoke portions. The outer ends of the spoke portions are circumferentially spaced from adjacent the outer ends of the spoke portions. The rib portions extend from the inner peripheral surface of the annular rim portion between at least some of adjacent pairs of the spoke portions. Each of the rib portions has a circumferential dimension extending between its ends, a radial dimension and an axial thickness. The radial dimension of each of the rib portions increasing in length as each of the rib portions extend from the ends to a middle rib section.

Also the foregoing objects can further be attained by providing a bicycle wheel, comprising an outer annular surface, first and second annular side surfaces, an inner peripheral surface, a plurality of spoke attachment points and a plurality of rib portions. The outer annular surface is adapted to receive a tire thereon. The first and second annular side surfaces are coupled to the outer annular surface and located radially inwardly the outer annular surface. The inner peripheral surface is located radially inwardly of the first and second annular side surfaces and couples the first and second annular side surfaces together. The outer peripheral surface, the first and second annular side surfaces and the inner peripheral surface form an annular body portion. The spoke attachment points are formed on at least one of said inner and side surfaces. The rib portions extend from the inner peripheral surface between at least some of adjacent pairs of the spoke attachment points. Each of the rib portions has a circumferential dimension extending between its ends and a radial dimension. The radial dimension of each of the rib portions increases in length as each of said rib portions extend from the ends to a middle rib section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is an edge elevational view of the unitary bicycle wheel illustrated in FIGS. 1 and 2 in accordance with the present invention;

FIG. 4 is a cross-sectional view of the unitary bicycle wheel illustrated in FIGS. 1–3 as seen along section line 4—4 of FIG. 1;

FIG. 5 is a partial, cross-sectional view of a first section of the rim portion of the unitary bicycle wheel illustrated in FIGS. 1–4 as seen along section line 5—5 of FIG. 1;

FIG. 6 is a partial, cross-sectional view of a second section of the rim portion of the unitary bicycle wheel illustrated in FIGS. 1–4 as seen along section line 6—6 of FIG. 1;

FIG. 11 is an edge elevational view of the bicycle wheel illustrated in FIG. in accordance with the present invention;

FIG. 12 is a cross-sectional view of the bicycle wheel illustrated in FIGS. 10 and 11 as seen along section line 12—12 of FIG. 10 with the hub portion and spokes removed for purposes of illustration;

FIG. 13 is a partial, cross-sectional view of a first section of the rim portion of the bicycle wheel illustrated in FIGS. 10–12 as seen along section line 13—13 of FIG. 10; and FIG. 14 is a partial, cross-sectional view of a second section of the rim portion of the unitary bicycle wheel illustrated in FIGS. 10–13 as seen along section line 14—14 of FIG. 10.

DETAILED DESCRIPTION OF THE PREFERRED EMBODIMENTS

Figure 1:
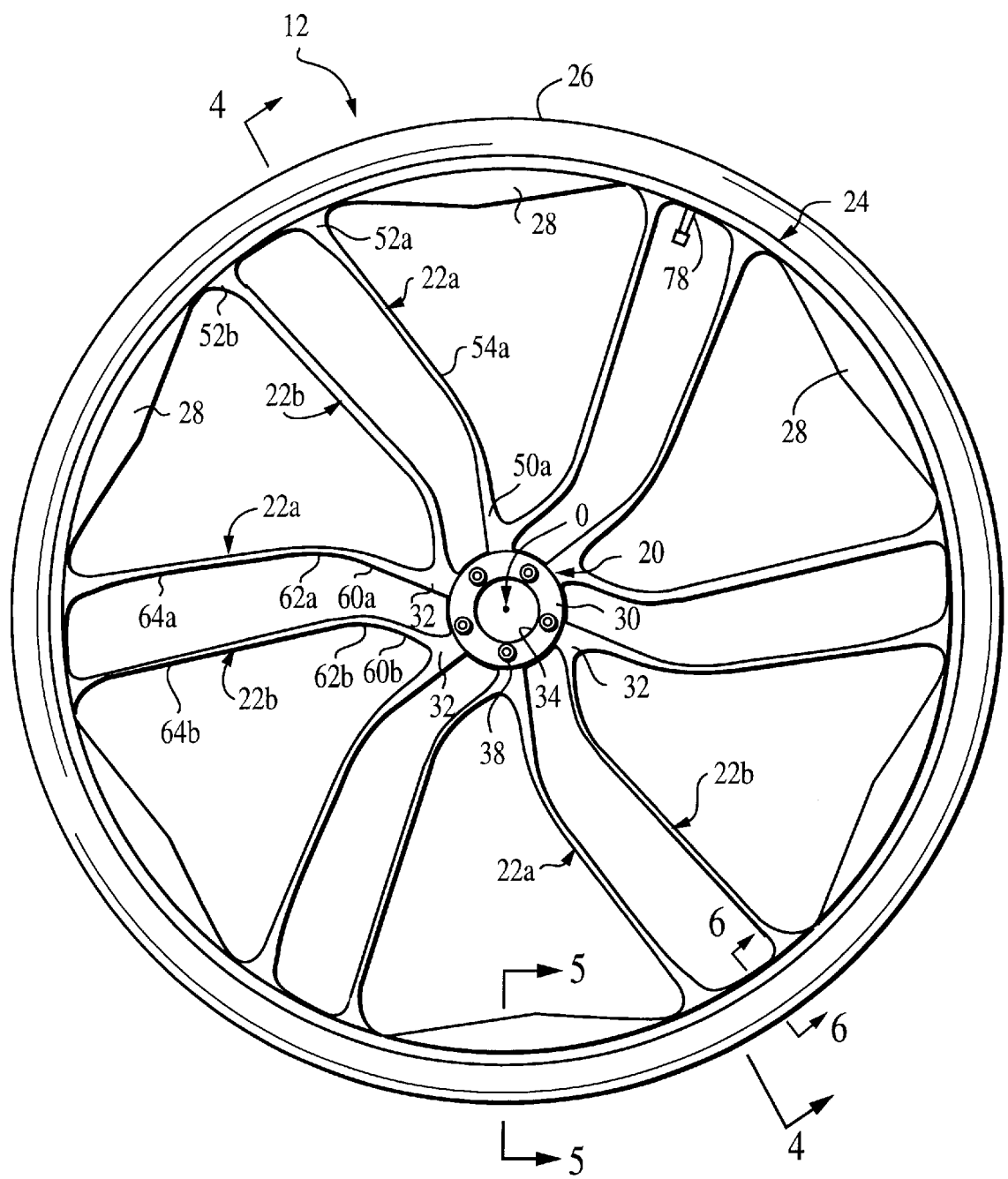
FIG. 1 is a first side elevational view of a unitary bicycle wheel with a hub portion, twelve spoke portions and a rim portion in accordance with a first embodiment of the present invention.
Figure 2:
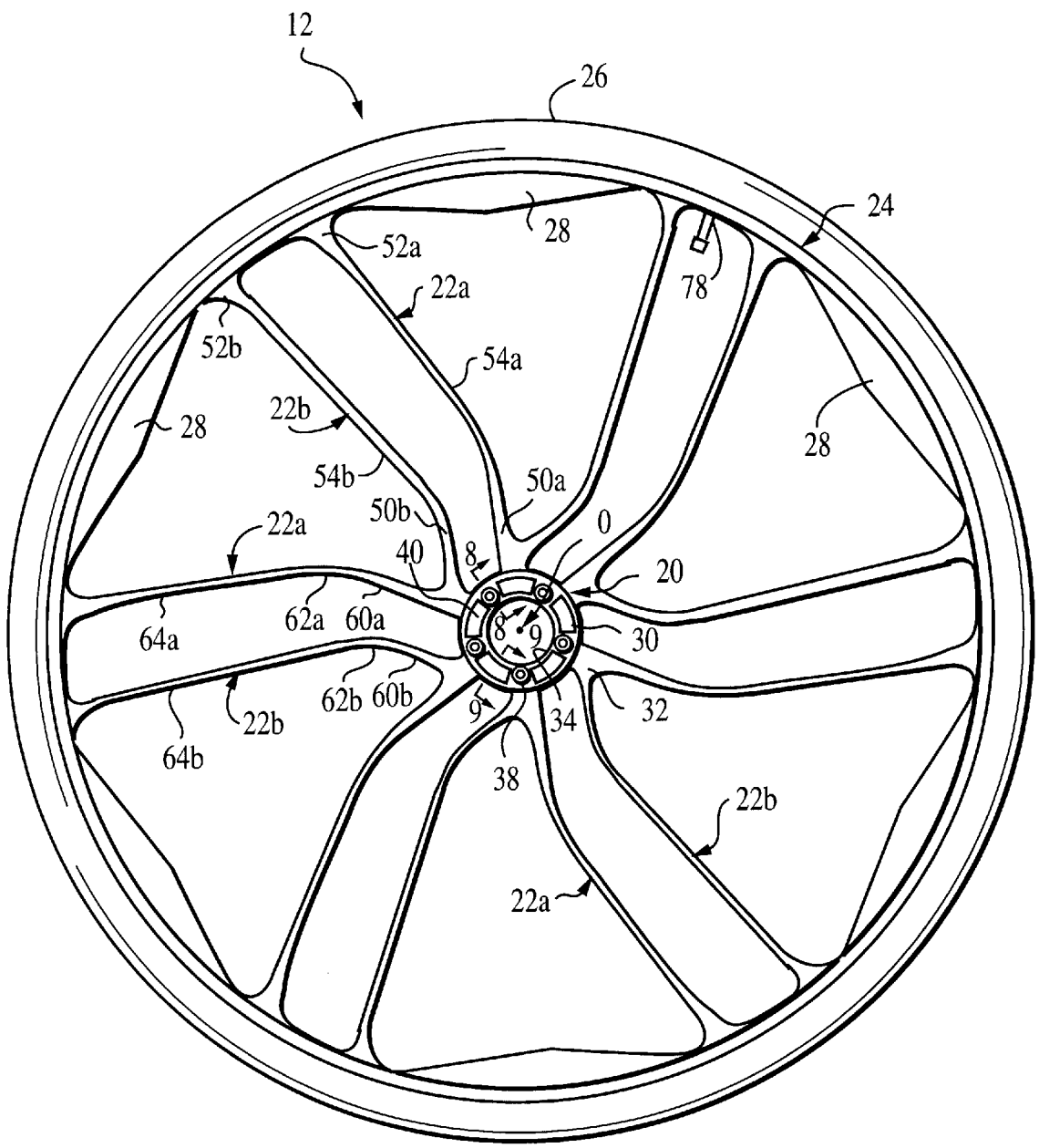
FIG. 2 is a second side elevational view of the unitary bicycle wheel illustrated in FIG. 1 in accordance with the present invention.

Referring initially to FIGS. 1 and 2, a unitary bicycle wheel 12 in accordance with the present invention is illustrated in accordance with the present invention. Bicycle wheel 12 can be utilized as either a front bicycle wheel or a rear bicycle wheel. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub portion 20, a plurality of outwardly extending spoke portions 22a, 22b and an annular rim portion 24 with a pneumatic tire 26 coupled thereto in a conventional manner. Spoke portions 22a, 22b are configured to flex in a radial direction to provide a comfortable ride. Stated differently, spoke portions 22a, 22b are configured to provide a shock absorbing function. This shock absorbing function is enhanced by the use of magnesium for wheel 12. The shape of spoke portions 22a and 22b absorb the vibrations from the ground as it is being used in the bicycle. Rim portion 24 is provided with rib portions 28 to increase the strength of rim portion 24 as discussed below.

In the illustrated embodiment shown herein, bicycle wheel 12 has twelve spoke portions 22a, 22b extending radially between central hub portion 20 and annular rim portion 24 and six rib portions 28. Of course, it will be apparent to those skilled in the art from this disclosure that the bicycle wheel 12 can have fewer or more spoke portions 22a, 22b than illustrated.

In the most preferred embodiment, bicycle wheel 12 is a one-piece, unitary wheel. The phrase "unitary member or wheel" as used herein to describe and claim the present invention means a wheel having its central hub potion 20, its spoke portions 22a, 22b and its annular rim portion 24 formed from one or more parts that are joined together as a single non-separable member. In other words, a "unitary member or wheel" can be constructed of several pieces that are coupled together such that the wheel must be broken, cut or destroyed to separate the parts. On the other hand, the phrase "one-piece, unitary member or wheel" as used herein to describe and claim the present invention means a wheel having its central hub potion 20, its spoke portions 22a, 22b and its annular rim portion 24 formed as a single continuous material. In other words, a "one-piece, unitary member or wheel" is not made of two or more parts that are permanently coupled together.

Preferably, the one-piece, unitary bicycle wheel 12 of the present invention is produced by die-casting. The preferred material for bicycle wheel 12 of the present invention is magnesium (Mg). Of course, it will be apparent to those skilled in the art from this disclosure that other suitable lightweight materials, such as aluminum, titanium or a high strength composite material, can be utilized as needed and/or desired. Aluminum will result in a heavier wheel, while titanium or a high strength composite material will result in an expensive wheel.

Figure 9:
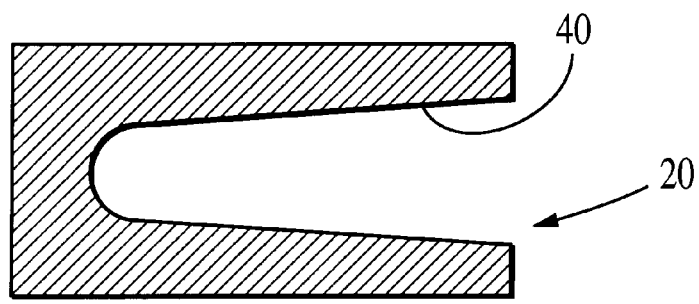
FIG. 9 is a partial, cross-sectional view of a second section of the hub portion of the unitary bicycle wheel illustrated in FIGS. 1–4 as seen along section line 9—9 of FIG. 2.

Hub portion 20 has a tubular body section 30 with six spoke attachment points 32. Tubular body section 30 has an axial bore 34 that is adapted to receive a hub assembly 36 (FIG. 3) therein in a conventional manner. Other types of hub assemblies can be coupled to tubular body section 30 via bolts that pass through mounting holes 38. As seen in FIGS. 2 and 9, the weight of hub portion 20 is reduces by five recesses 40 that are located between mounting holes 38. In other words, recesses 40 reduce the amount of material use to form hub portion 20 for minimizing its weight.

The number and shape of the spoke attachment points 32 will depend upon the number of spokes and their shapes. Accordingly, it will be apparent to those skilled in the art from this disclosure that other types and shapes of hubs can be utilized in connection with the present invention.

As seen in FIGS. 1–3, spoke portions 22a and 22b form six sets of two pokes that are preferably identical to each other. In other words, each of the six poke portions 22a are identical to each other and each of the six spoke portions 22b are identical to each other. Of course, it will be apparent to those skilled in the art from this disclosure that the bicycle wheel 12 can have fewer or more spoke portions 22a, 22b than illustrated. The fewer spoke portions 22a, 22b utilized the better since it will reduce the weight of the wheel 12 and improve the appearance of wheel 12.

As seen in FIGS. 1, 2 and 4, each of the spoke portions 22a has an inner end 50a coupled to hub portion 20, an outer end 52a coupled to rim portion 24, and a middle spoke section 54a located between inner and outer ends 50a and 52a, respectively. Likewise, each of the spoke portions 22b has an inner end 50b coupled to hub portion 20, an outer end 52b coupled to rim portion 24, and a middle spoke section 54b located between inner and outer ends 50b and 52b, respectively.

The inner ends 50a and 50b of adjacent spoke portions 22a and 22b are integrally formed at one of the spoke attachment points 32 of hub portion 20. The outer ends 52a and 52b of these spoke portions 22a and 22b diverge radially outwardly from the spoke attachment points 32 of hub portion 20 to rim portion 24. The inner ends 50a, 50b and the outer ends 52a, 52b gradually increase in thickness as they approach hub portion 20 and rim portion 24, respectively. In other words, inner ends 50a, 50b and outer ends 52a and 52b are thicker than middle spoke sections 54a and 54b.

Of course, it will be apparent to those skilled in the art that the entire length of spoke portions 22a and 22b can be substantially uniform along its entire cross-section if needed and/or desired. Moreover, it will also be apparent to those skilled in the art that a variety of cross-sectional shapes can be used as needed and/or desired. For example, spoke portions with an elliptical cross-section could be used in accordance with the present invention.

The middle spoke sections 54a and 54b are configured to decrease radial stiffness of wheel 12. Stated differently, middle spoke sections 54a and 54b are configured to provide a shock absorbing function. This shock absorbing function is enhanced by the use of magnesium for wheel 12. The shape of spoke portions 22a and 22b absorb the vibrations from the ground as it is being used in the bicycle. Spoke portions 22a have a different radial stiffness than spoke portions 22b due to their different configurations. Spoke portions 22a are preferably stiffer than spoke portions 22b in that spoke portions 22b are bent more than spoke portions 22a and the bent segment of spoke portions 22b are closer to axis O of wheel 12.

Middle spoke sections 54a and 54b of spoke portions 22a and 22b have at least three different segments between their respective inner ends 50a, 50b and their outer ends 52a, 52b such that spoke portions 22a and 22b are bent or curved. In particular, middle spoke section 54a of each of the spoke portions 22a has a first or inner segment 60a adjacent inner end 50a, a second or intermediate segment 62a and a third or outer segment 64a adjacent outer end 52a. Preferably, these segments 60a, 62a and 64a have substantially radially extending center lines that are curved. The center lines of first and third segments 60a and 64a have large radiuses of curvature relative to the center line of second segment 62a such that a bend or angular point is formed by second segment 62a. For example, the center line of first segment 60a has a radius of curvature of approximately 400 mm, the center line of second segment 62a has a radius of curvature of approximately 55 mm and the center of third segment 64a has a radius of curvature of approximately 1200 mm.

Likewise, middle spoke section 54b of each of the spoke portions 22b has a first or inner segment 60b adjacent inner end 50b, a second or intermediate segment 62b and a third or outer segment 64b adjacent outer end 52b. The center lines of first and third segments 60b and 64b have large radiuses of curvature relative to the center line of second segment 62b such that a bend or angular point is formed by second segment 62b. For example, the center line of first segment 60b has a radius of curvature of approximately 435 mm, the center of second segment 62b has a radius of curvature of approximately 80 mm and the center of third segment 64b has a radius of curvature of approximately 1200 mm.

As seen in FIGS. 2 and 3, first segments 60a and 60b of spoke portions 22a and 22b are substantially straight segments (larger radiuses of curvatures) that are parallel too each other. Since second segment 62a of spoke portion 22a has a smaller radius of curvature than second segment 62b of spoke portion 22b, spoke portions 22a are more bent than spoke portions 22b. Moreover, the bend of spoke portions 22a are located farther from center axis O of hub portion 20 than the bend of spoke portion 22b. When a radially extending line is drawn from center axis O of hub portion 20 to one of the outer ends 52a or 52b, the corresponding middle spoke portion 54a or 54b is located on one side of the radial line. Accordingly, this bent shape of spoke portions 22a and 22b provides a shock absorbing effect for rim portion 24. Of course, the shapes spoke portions 22a and/or 22b can be modified as needed and/or desired to accomplish the advantages of the present invention in view of this disclosure.

In the illustrated embodiment, middle spoke portions 54a and 54b of spoke portions 22a and 22b have an elongated cross-section such as a rectangular cross-section with an axial length that is larger than the circumferential width. Middle spoke portions 54a and 54b of spoke portions 22a and 22b are tapered as seen in FIG. 4. In particular, middle spoke portions 54a and 54b of spoke portions 22a and 22b are widest at hub portion 20 and narrowest at rim portion 24.

Accordingly, spoke portions 22a and 22b can flex in a circumferential direction to allow rim portion 24 to flex radially inwardly to absorb shocks. In other words, spoke portions 22a and 22b are configured to be stiffer in an axial direction than the circumferential direction.

Figure 7:
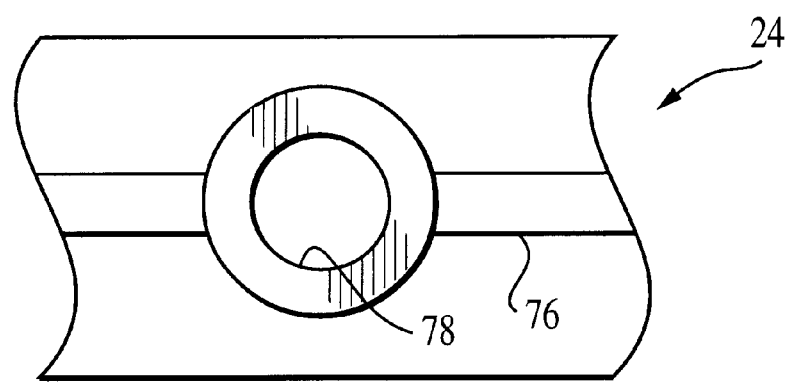
FIG. 7 is an enlarged top view of the inner peripheral surface of the rim portion of the unitary bicycle wheel to show the opening for the valve stem in accordance with of the present invention.
Figure 8:
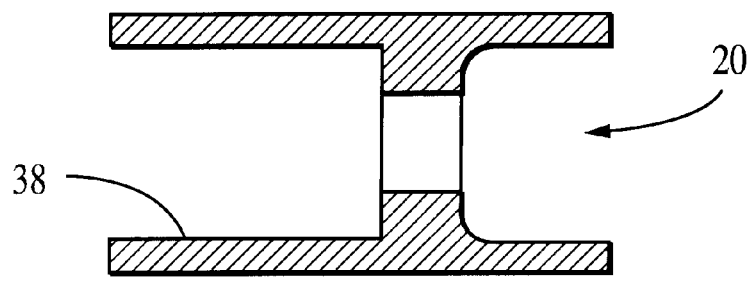
FIG. 8 is a partial, cross-sectional view of a first section of the hub portion of the unitary bicycle wheel illustrated in FIGS. 1–4 as seen along section line 8—8 of FIG. 2.

As best seen in FIGS. 1 and 2, rim portion 24 is designed to have pneumatic tire 26 secured thereto in a conventional manner. As seen in FIGS. 3–6, rim portion 24 has a U-shaped cross section with an inner peripheral surface 70, a pair of annular side surfaces 72 and an outer peripheral surface 74. The rim portion 24 also has a hole 78 for a valve stem as seen in FIG. 7. The inner peripheral surface 70 is coupled to outer ends 52a and 52b of spoke portions 22a and 22b. Outer peripheral surface 74 forms a recess for accommodating pneumatic tire 26 in a conventional manner. Of course, rim portion 24 can be a variety of shapes as desired.

Centrally located rib portions 28 are located between adjacent spoke portions 22a and 22b that extend from the same spoke attachment point 32 of hub portion 20. A smaller centrally located rib portion 76 is located between adjacent spoke portions 22a and 22b that extend from different spoke attachment points 32 of hub portion 20. Each rib portion 28 extends radially inwardly from the inner peripheral surface 70 of rim portion 24. Each of rib portions 28 has a circumferential dimension extending between its outer ends 52a and 52b of adjacent spoke portions 22a and 22b extending from the same spoke attachment point 32 of hub portion 20, a radial dimension and an axial thickness. The radial dimension of each of the rib portions 28 increases in length as each of the rib portions 28 extend from outer ends 52a and 52b of adjacent spoke portions 22a and 22b to a middle segment. Preferably, the middle segment of each of the rib portions 28 has a radial height that is approximately equal to or greater than the maximum radial height of rim portion 24 plus more than half of the maximum radial height of rim portion 24.

Rib portion 28 was designed to maximize the strength of rim portion 24 between spokes 22a and 22b such that it can bare the tension forces and stresses placed thereupon. In particular, wheel 12 of the present invention is designed to minimize the use of spokes. However, the fewer spokes that are used, creates an area which can be easily bent. In order to reduce the stresses in this area, rib portions 28 are utilized. Rib portions 28 are located on the center plane of the rim portion 24 between the side surfaces. The axial thickness of rib portions 28 are substantially thinner than the width of rim portion 24 between the side portions so as to minimize the weight of the rim portion 24.

Bicycle Wheel 112

Referring now to FIGS. 10–14, a bicycle wheel 112 in accordance with the second embodiment is illustrated. The main difference between this embodiment and the first embodiment is that wheel 112 is not a one-piece, unitary member as is wheel 12 and does not have shock absorbing spokes. Rather, wheel 112 is constructed of several separable parts that can be separated without cutting, breaking or otherwise damaging the parts.

Figure 10:
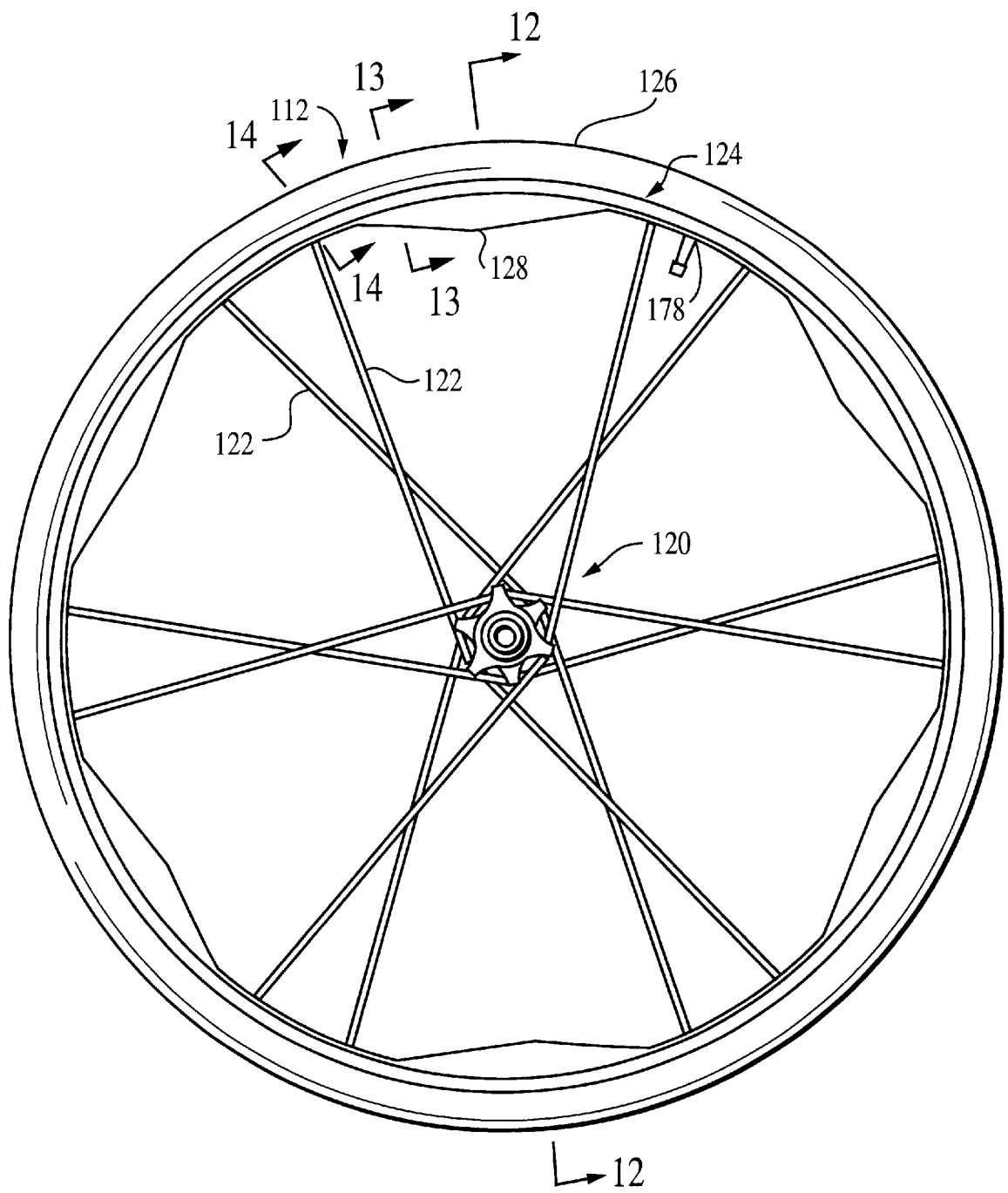
FIG. 10 is a side elevational view of a bicycle wheel in accordance with a second embodiment of the present invention.

As seen in FIG. 10, bicycle wheel 112 has a central hub portion 120, a plurality of outwardly extending spoke portions 122 and an annular rim portion 124 with a pneumatic tire 126 coupled thereto in a conventional manner. Rim portion 124 is provided with rib portions 128 to increase the strength of rim portion 124 in substantially the same manner as discussed above.

In view of the similarities between wheel 112 of this embodiment and wheel 12 of the prior embodiment of the present invention, wheel 112 will not be discussed or illustrated in detail herein. Rather, the previous description of the first embodiment of the present invention applies to this embodiment to the extent that it does not contradict the drawings and/or the description thereof As seen in FIGS. 11–14, rim portion 124 has a U-shaped cross section with an inner peripheral surface 170, a pair of annular side surfaces 172 and an outer peripheral surface 174. The rim portion 124 also has a hole 178 for a valve stem. The rim portion 124 also a plurality of holes 179 for attaching spoke portions 122 thereto. The inner peripheral surface 170 is coupled to outer ends of spoke portions 122.

Spoke portions 122 are circumferentially spaced about rim portion 124 with alternating spacing between adjacent spoke portions 122. Centrally located rib portions 128 are located between adjacent spoke portions 122 that are spaced farther from each other. A smaller centrally located rib portion 176 is located between adjacent spoke portions 122 that are spaced closer to each other. Each rib portion 128 extends radially inwardly from the inner peripheral surface 170 of rim portion 124. Each of rib portions 128 has a circumferential dimension extending between its outer ends of adjacent spoke portions 122, a radial dimension and an axial thickness. The radial dimension of each of the rib portions 128 increases in length as each of the rib portions 128 extend from outer ends of adjacent spoke portions 122 to a middle segment. Preferably, the middle segment of each of the rib portions 128 has a radial height that is approximately equal to or greater than the maximum radial height of rim portion 124 plus more than half of the maximum radial height of rim portion 124.

Rib portion 128 was designed to maximize the strength of rim portion 124 between spokes 122 such that it can bare the tension forces and stresses placed thereupon. In particular, wheel 112 of the present invention is designed to minimize the use of spokes. However, the fewer spokes that are used, create an area that can be easily bent. In order to reduce the stresses in this area, rib portions 128 are utilized. Rib portions 128 are located on the center plane of the rim portion 124 between the side surfaces. The axial thickness of rib portions 128 are substantially thinner than the width of rim portion 124 between the side portions so as to minimize the weight of the rim portion 124.

While only two embodiments have been chosen to illustrate the present invention, it will be readily apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle wheel, comprising:

a central portion;

a plurality of first spoke portions extending outwardly from said central portion with each of said first spoke portions having a first inner end coupled to said central portion and a first outer end;

a plurality of second spoke portions extending outwardly from said central portion between said first spoke portions, each of said second spoke portions having a second inner end coupled to said central portion and a second outer end;

an annular rim portion having an outer peripheral surface forming a tire receiving recess thereon and an inner peripheral surface coupled to said first and second outer ends of said first and second spoke portions, said first outer ends of said first spoke portions being circumferentially spaced by a first distance from an adjacent one of said second spoke portions located on one side and circumferentially spaced by a second distance from another adjacent one of said second spoke portions on the other side, said second distance being smaller than said first distance; and a plurality of rib portions extending from said inner peripheral surface of said annular rim portion between at least some of said first and second spoke portions that are separated by said first distance, each of said rib portions having a circumferential dimension extending between its ends and a radial dimension, said radial dimension of each of said rib portions increasing in length as each of said rib portions extend from said ends to a middle rib section.

2. The bicycle wheel according to claim 1, wherein said central portion is a hub portion with an axial hub assembly receiving bore formed therein.

3. The bicycle wheel according to claim 1, wherein said central portion, said first spoke portions, said second spoke portions, said annular rim portion and said rib portions are formed of magnesium.

4. The bicycle wheel according to claim 1, wherein said central portion, said first spoke portions, said second spoke portions, said annular rim portion and said rib portions are formed together as a one-piece, unitary member.

5. The bicycle wheel according to claim 1, wherein said first spoke portions have first middle sections located between said first inner and outer ends, said first middle section having a first bent segment; and said second spoke portions have second middle sections located between said second inner and outer ends, said second middle section having a second bent segment to decrease radial stiffness of said wheel.

6. The bicycle wheel according to claim 5, wherein said first bent segments of said first spoke portions are located closer to said first inner ends than said first outer ends; and said second bent segments of said second spoke portions are located closer to said second inner ends than said second outer ends.

7. The bicycle wheel according to claim 5, wherein said first bent segments of said first spoke portions are curved segments that are located between first inner and first outer segments; and said second bent segments of said second spoke portions are curved segments that are located between second inner and second outer segments.

8. The bicycle wheel according to claim 7, wherein said first inner and first outer segments are curved segments with radiuses of curvatures that are larger than said first bent segments; and said second inner and second outer segments are curved segments with radiuses of curvatures that are larger than said second bent segments.

9. The bicycle wheel according to claim 5, wherein said first middle sections of said first spoke portions have a cross section with a first axial length and a first circumferential width that is smaller than said first axial length of said first middle sections; and said second middle sections of said second spoke portions have a cross section with a second axial length and a second circumferential width that is smaller than said second axial length of said second middle sections.

10. The bicycle wheel according to claim 9, wherein said first middle sections of said first spoke portions taper in said first axial length from said first inner ends to said first outer ends, with said first axial lengths being larger at said first inner ends as compared with said first outer ends; and said second middle sections of said second spoke portions taper in said second axial length from said second inner ends to said second outer ends, with said second axial lengths being larger at said second inner ends as compared with said second outer ends.

11. The bicycle wheel according to claim 1, wherein said central portion has a plurality of spoke attachment points with adjacent pairs of said first and second spoke portions being coupled to said central portion by a common one of said spoke attachment points.

12. The bicycle wheel according to claim 1, wherein said annular rim portion has a substantially uniform maximum radial height extending between said outer peripheral surface and said inner peripheral surface; and each of said annular rib portions has a radial height at its said middle rib section that is greater than one and one-half of said radial height of said annular rim portion.

13. The bicycle wheel according to claim 1, wherein each of said annular rib portions is thinner than said annular rim portion as measured in an axial direction.

14. A bicycle wheel, comprising:

a central portion;

a plurality of first spoke portions extending outwardly from said central portion with each of said first spoke portions having a first inner end coupled to said central portion, a first outer end, and a first middle section located between said first inner and first outer ends, said first middle section having a first radial stiffness having a first bent segment to decrease radial stiffness of said wheel;

a plurality of second spoke portions extending outwardly from said central portion with each of said second spoke portions having a second inner end coupled to said central portion, a second outer end, and a second middle section located between said second inner and second outer ends, said second middle section having a second radial stiffness that is different from said first radial stiffness of said first spoke portions; and an annular rim portion having an inner peripheral surface coupled to said outer ends of said first spoke portions and an outer peripheral surface forming a tire receiving surface thereon.

15. The bicycle wheel according to claim 14, wherein said central portion is a hub portion with an axial hub assembly receiving bore formed therein.

16. The bicycle wheel according to claim 14, wherein said central portion, said first and second spoke portions, said annular rim portion and said rib portions are formed of magnesium.

17. The bicycle wheel according to claim 14, wherein said central portion, said first and second spoke portions, said annular rim portion and said rib portions are formed together as a one-piece, unitary member.

18. The bicycle wheel according to claim 14, wherein said first bent segments of said first spoke portions are located closer to said first inner ends than said first outer ends.

19. The bicycle wheel according to claim 18, wherein said second middle sections have second bent segments.

20. The bicycle wheel according to claim 19, wherein said second bent segments of said second spoke portions are located closer to said central portion than said first bent segments of said first spoke portions.

21. The bicycle wheel according to claim 19, wherein said second bent segments of said second spoke portions are curved segments that are located between second inner segments and second outer segments.

22. The bicycle wheel according to claim 14, wherein said first bent segments of said first spoke portions are curved segments that are located between first inner segments and first outer segments.

23. The bicycle wheel according to claim 22, wherein said first inner segments and first outer segments are curved segments with radiuses of curvatures that are larger than said first bent segments.

24. The bicycle wheel according to claim 14, wherein said first middle sections of said first spoke portions have a cross section with a first axial length and a first circumferential width that is smaller than said first axial length of said first middle sections.

25. The bicycle wheel according to claim 24, wherein said first middle sections of said first spoke portions taper in said first axial length form said first inner ends to said first outer ends, with said first axial lengths being larger at said first inner ends as compared with said first outer ends.

26. The bicycle wheel according to claim 14, wherein said central portion has a plurality of spoke attachment points with adjacent pairs of said first and second spoke portions being coupled to said central portion by a common one of said spoke attachment points.

27. The bicycle wheel according to claim 26, wherein said rim portion includes annular rib portions extending inwardly from said inner peripheral surface with said annular rib portions being thinner than said annular rim portion as measured in an axial direction.

28. The bicycle wheel according to claim 27, wherein said annular rim portion has a substantially uniform maximum radial height extending between said outer peripheral surface and said inner peripheral surface; and each of said annular rib portions has a radial height at its said middle rib section that is greater than one and one-half of said radial height of said annular rim portion.

29. The bicycle wheel according to claim 26, wherein said second middle sections have second bent segments.

30. The bicycle wheel according to claim 29, wherein said first bent segments of said first spoke portions are curved segments that are located between first inner and first outer segments; and said second bent segments of said second spoke portions are curved segments that are located between second inner and second outer segments.

31. The bicycle wheel according to claim 30, wherein said first inner and first outer segments are curved segments with radiuses of curvatures that are larger than said first bent segments; and said second inner and second outer segments are curved segments with radiuses of curvatures that are larger than said second bent segments.

32. A bicycle wheel, comprising:

a central portion;

a plurality of spoke portions extending outwardly from said central portion with each of said spoke portions having an inner end coupled to said central portion and an outer end;

an annular rim portion having an outer peripheral surface forming a tire receiving recess thereon, first and second annular side surfaces coupled to said outer annular surface and an inner peripheral surface coupled to said outer ends of said spoke portions, said outer ends of said spoke portions being circumferentially spaced from adjacent said outer ends of said spoke portions; and a plurality of rib portions extending from said inner peripheral surface of said annular rim portion between at least some of said spoke portions, each of said rib portions having a circumferential dimension extending between its ends, a radial dimension and an axial thickness, said radial dimension of each of said rib portions increasing in length as each of said rib portions extend from said ends to a middle rib section.

33. The bicycle wheel according to claim 32, wherein said central portion is a hub portion with an axial hub assembly receiving bore formed therein.

34. The bicycle wheel according to claim 32, wherein said central portion, said spoke portions, said annular rim portion and said rib portions are formed of magnesium.

35. The bicycle wheel according to claim 32, wherein said central portion, said spoke portions, said annular rim portion and said rib portions are formed together as a one-piece, unitary member.

36. The bicycle wheel according to claim 32, wherein said spoke portions have middle spoke sections located between said inner and outer ends, said middle spoke section being configured with a first bent segment to decrease radial stiffness of said wheel and to allow said spoke portions to bend in a circumference direction.

37. The bicycle wheel according to claim 36, wherein said bent segments of said spoke portions are located closer to said inner ends than said outer ends.

38. The bicycle wheel according to claim 36, wherein said bent segments of said spoke portions are curved segments that are located between inner and outer segments.

39. The bicycle wheel according to claim 38, wherein said inner and outer segments are curved segments with radiuses of curvatures that are larger than said bent segments.

40. The bicycle wheel according to claim 36, wherein said middle spoke sections of said spoke portions have a cross section with an axial length and a circumferential width that is smaller than said axial length of said middle spoke sections.

41. The bicycle wheel according to claim 40, wherein said middle spoke sections of said spoke portions taper in s aid axial length form said inner ends to said outer ends, with said axial lengths being larger at said inner ends as compared with said outer ends.

42. The bicycle wheel according to claim 32, wherein said central portion has a plurality of spoke attachment points with adjacent pairs of said spoke portions being coupled to said central portion by a common one of said spoke attachment points.

43. The bicycle wheel according to claim 32, wherein said annular rim portion has a substantially uniform maximum radial height extending between said outer peripheral surface and said inner peripheral surface; and each of said annular rib portions has a radial height at its said middle rib section that is greater than one and one-half of said radial height of said annular rim portion.

44. The bicycle wheel according to claim 32, wherein each of said annular rib portions is thinner than said annular rim portion as measured in an axial direction.

45. A bicycle rim, comprising:

an outer annular surface forming a tire receiving surface thereon;

first and second annular side surfaces coupled to said outer annular surface and located radially inwardly said outer annular surface;

an inner peripheral surface located radially inwardly of said first and second annular side surfaces and coupling said first and second annular side surfaces together, said outer peripheral surface, said first and second annular side surfaces and said inner peripheral surface forming an annular body portion;

a plurality of circumferentially arranged spoke attachment points formed on at least one of said inner and side surfaces; and a plurality of rib portions extending from said inner peripheral surface between at least some of said spoke attachment points, each of said rib portions having a circumferential dimension extending between its ends and a radial dimension, said radial dimension of each of said rib portions increasing in length as each of said rib portions extend from said ends to a middle rib section.

46. The bicycle rim according to claim 45, wherein said annular body portion and said rib portions are formed of magnesium.

47. The bicycle rim according to claim 45, wherein said annular body portion and said rib portions are formed together as a one-piece, unitary member.

48. The bicycle rim according to claim 45, wherein said annular body portion has a substantially uniform maximum radial height extending between said outer peripheral surface and said inner peripheral surface; and each of said annular rib portions has a radial height at its said middle rib section that is greater than one and one-half of said radial height of said annular body portion.

49. The bicycle rim according to claim 45, wherein each of said annular rib portions is thinner than said annular body portion as measured in an axial direction between said first and second annular side surfaces.

50. The bicycle rim according to claim 45, wherein said spoke attachment points are circumferentially spaced openings formed in said inner peripheral surface.

\* \* \* \* \*